Sept. 25, 1928.  1,685,572

O. ONSRUD

WOODWORKING MACHINE

Filed Feb. 4, 1928     4 Sheets-Sheet 1

Inventor
Oscar Onsrud
Rummler & Rummler
Attys.

Sept. 25, 1928.  1,685,572
O. ONSRUD
WOODWORKING MACHINE
Filed Feb. 4, 1928   4 Sheets-Sheet 2

Inventor
Oscar Onsrud

Sept. 25, 1928. 1,685,572
O. ONSRUD
WOODWORKING MACHINE
Filed Feb. 4, 1928   4 Sheets-Sheet 3
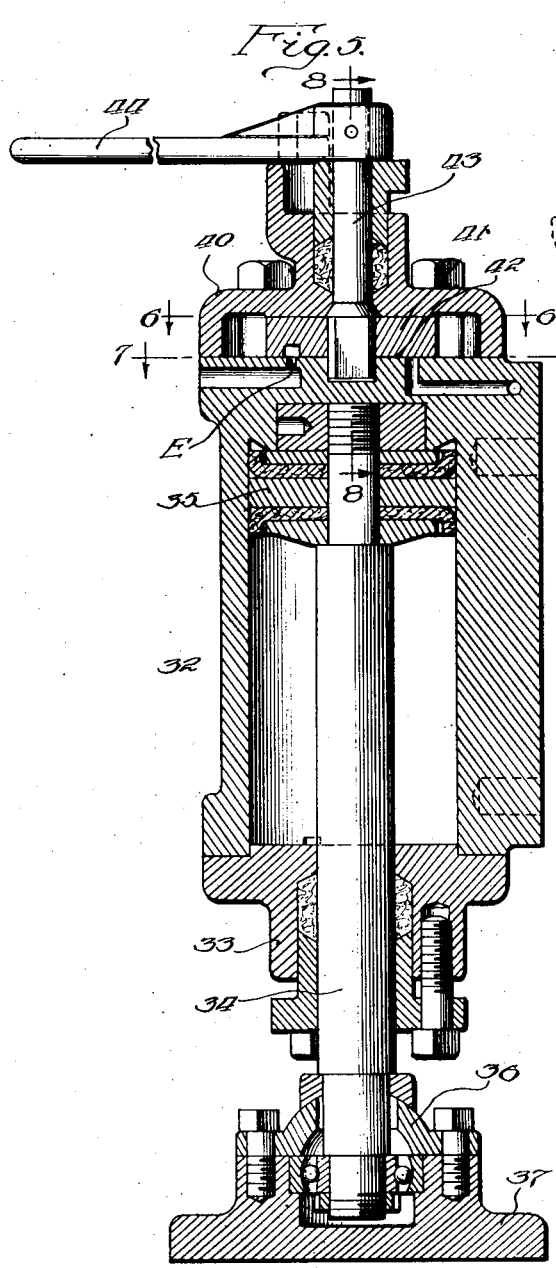
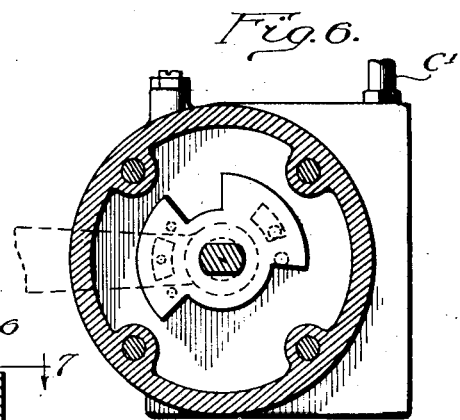
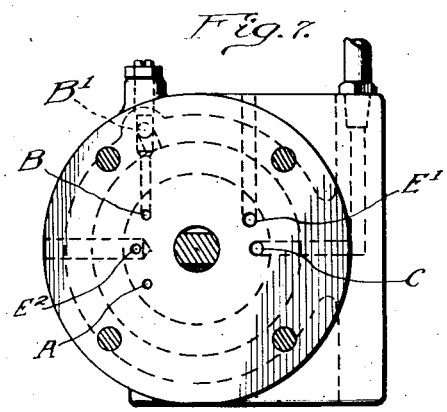
Inventor
Oscar Onsrud

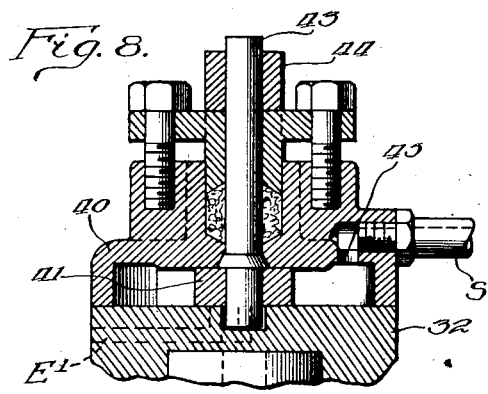
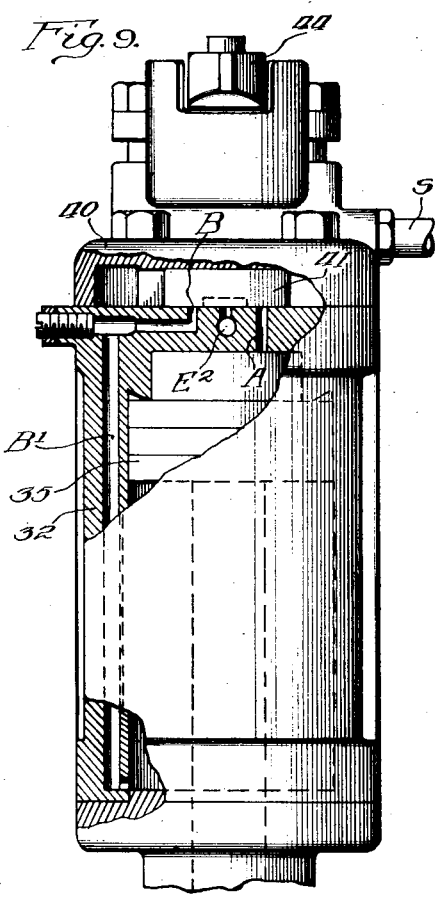
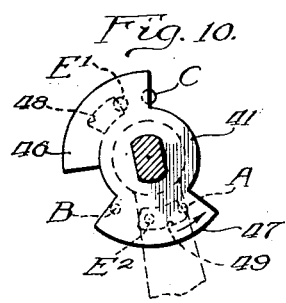
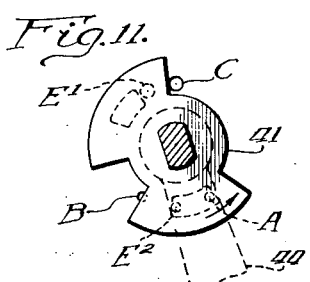
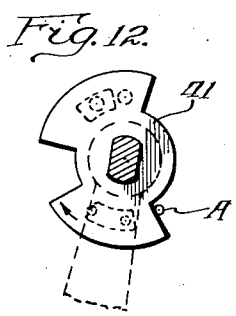
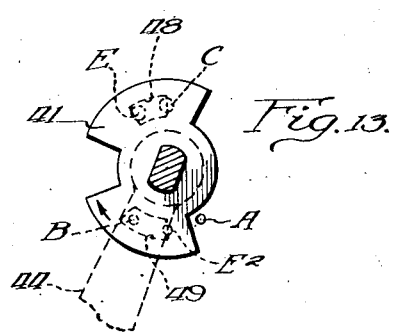

Patented Sept. 25, 1928.

1,685,572

UNITED STATES PATENT OFFICE.

OSCAR ONSRUD, OF CHICAGO, ILLINOIS, ASSIGNOR TO ONSRUD MACHINE WORKS, INC., OF CHICAGO, ILLINOIS, A CORPORATION OF ILLINOIS.

WOODWORKING MACHINE.

Application filed February 4, 1928. Serial No. 251,887.

This invention relates to improvements in wood working machines such as the wood shaper shown in my co-pending application, Serial No. 147,197 filed November 12, 1926; and relates more particularly to improvements in work clamping and controlling means.

The main objects of this invention are to provide an efficient machine for handling work in continuous production; to provide a machine which is easily controlled and fast in operation; to provide for rapid handling of the work; and to provide a unitary control for the cutter and the work clamp which operates in an interlocking manner to obviate the possibility of throwing the cutter into contact with the work unless the work is firmly clamped, and which operates automatically under one control lever to throw the cutter out of operation before the work can be unclamped.

An illustrative embodiment of this invention is shown in the accompanying drawings in which:

Fig. 5 is a cross section in the pneumatic work clamp and control valve.

Fig. 6 is a detail section taken on the line 6—3 of Fig. 5.

Fig. 7 is a view take on the plane of the line 7—7 of Fig. 5 with the valve housing removed.

Fig. 8 is a section taken on the line 8—8 of Fig. 5.

Fig. 9 is an elevation of the valve looking from the left in Fig. 5, with parts broken away and parts shown in section.

Figs. 10, 11, 12 and 13 are diagrammatic views of the valve disc and ports, in different positions which will be more fully described hereinafter.

Figure 1:
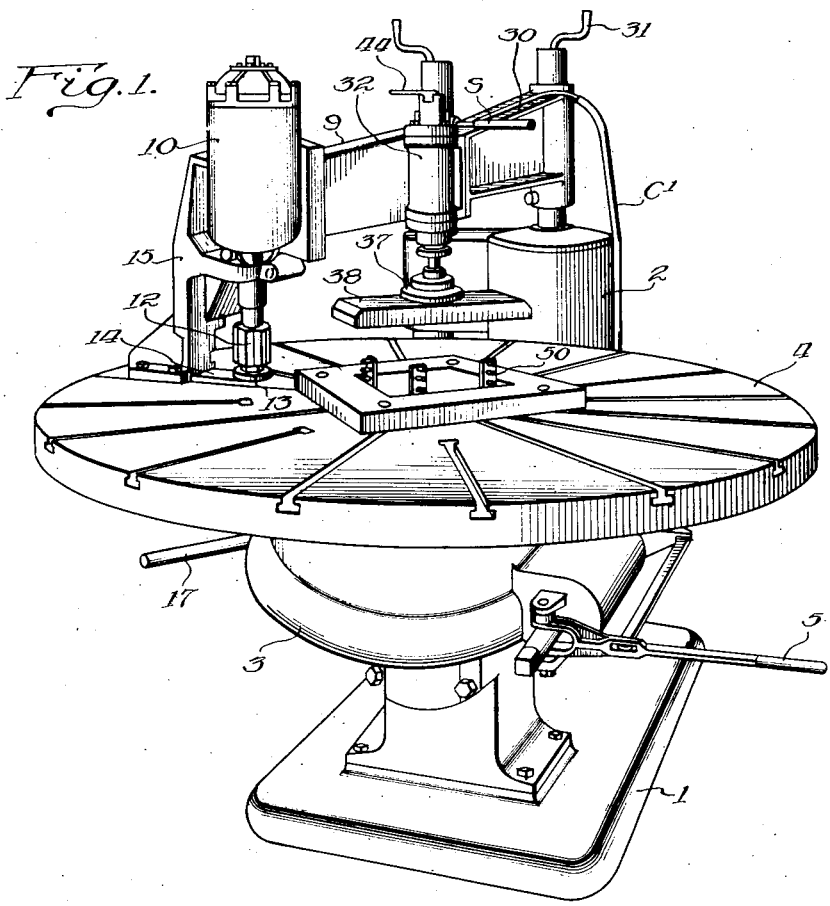
Figure 1 is a perspective view of the machine with the parts shown in normal condition when the machine is idle.

At the rear of the base 1 of the machine is mounted a column 2 to which is connected the knee 3 which is also bolted to the base 1. Resting on and rotatably mounted in the knee is provided the circular work table 4. The table 4 is rotated by means of a suitable worm and worm gear contained in the knee, and started and stopped by means of the control lever 5, as is more clearly shown in the application referred to above. At the left side of the column 2 are provided bearing brackets 6 and 7 in which is rotatably mounted the vertical shaft 8.

The cutter arm 9 is rigidly secured to the upper portion of the shaft 8, to swing over the work table 4. In the outer end of the arm 9 is mounted a high speed fluid driven turbine 10 which carries on the lower end of its shaft 11, the rotary cutter 12. Below the cutter 12 and also on the shaft 11 is mounted the pattern tracing roller 13 which is provided with an adjustable steady rest 14; the steady rest being carried in an adjustable slide 15 which is secured to the side of the turbine 10. Below the table 4 is provided a control arm 16 which is secured to the shaft 8, and provided with a handle 17 for manually controlling the position of the cutter 12.

The cutter is urged toward the center of the table 4 to contact with the work mounted on the table, by means of a suitable weight which is freely suspended within the knee 3 and connected to the outer end of the control lever 16 by means of the cable 18.

Figure 4:
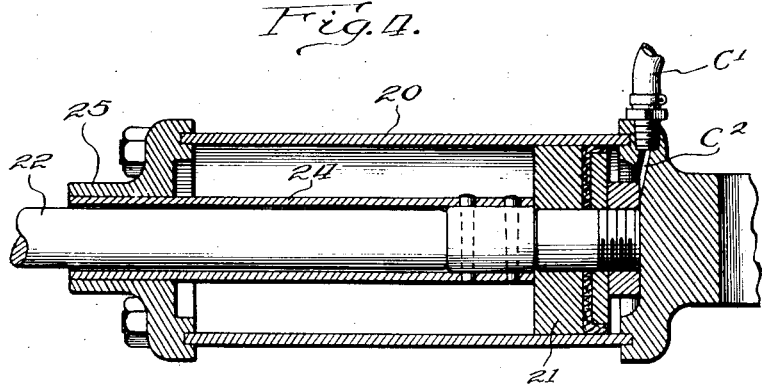
Fig. 4 is a cross section of the piston shown in Fig. 3.
Figure 2:
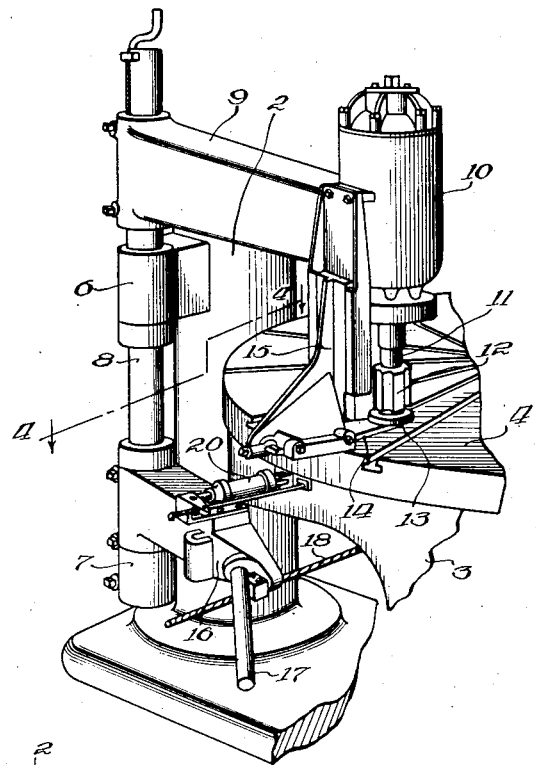
Fig. 2 is a fragmentary perspective view of the left side of the machine.
Figure 3:
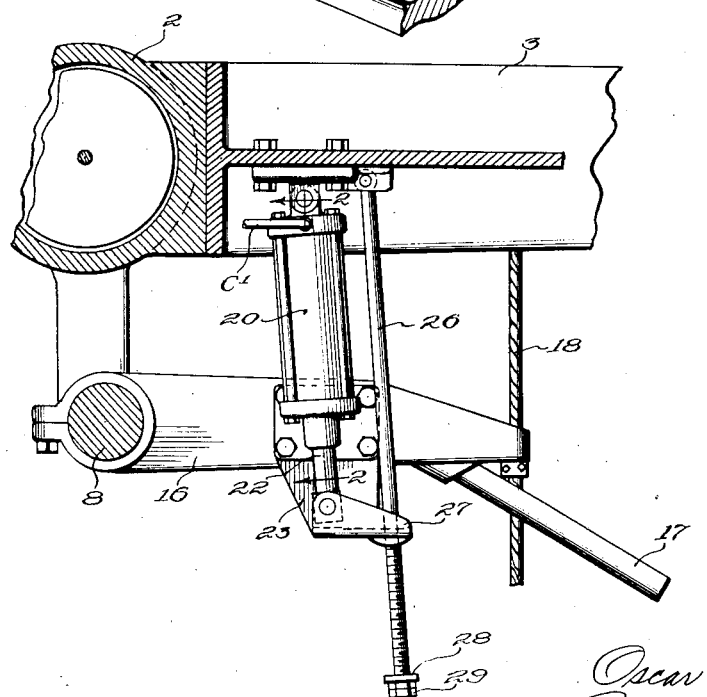
Fig. 3 is a plan section of the cutter control piston shown in Fig. 2.

For controlling the engagement of the cutter with the work mounted on the table, the air cylinder 20 is pivotally connected to the knee below the table, and is provided with a piston 21 which abuts against the inner end of a rod 22 which is pivotally connected to a bracket 23 which is bolted to the controlled arm 16. The piston 21 is attached to a sleeve 24 which extends slidably through the outer head 25 of the cylinder 20, and the inner end of the rod 22 is guided in the sleeve, as shown in Fig. 4. For limiting the outward movement of the arm 16, a stop is provided by a rod 26. The rod 26 is pivotally connected to the knee, and extends slidably through a lateral projection 27 formed on the bracket 23, and is provided with a threaded collar 28 and lock nut 29 in the outer end.

On the upper end of the column 2 is supported the work clamp arm 30, the arm being set in the desired vertical position by means of an adjustment controlled by the crank 31. On the outer end of the arm, in alinement with the axis of the work table 4, is bolted the work clamp piston 32. The upper end of the piston is closed and the lower end is provided with a packing gland 33 through which the plunger 34 extends into the bore of the cylinder where it is connected to the piston 35. On the lower end of the plunger 34 is connected, by means of a universal joint 36, a plate 37 to which the clamping block 38 is bolted.

The control valve is mounted on the upper end of the cylinder 32 and consists of the housing 40 which covers and holds the valve 41 against the flat valve seat 42 which is formed on the outer surface of the end of the cylinder. The valve stem 43 extends slidably through the center of the housing 40, and engages in an oblong hole in the center of the disc 41. At the outer end of the stem 43 is secured the valve operating handle 44.

The air pressure supply hose S is connected to a port 45 in the housing 40 which communicates the air pressure to the sides and upper surface of the disc 41. In the valve seat 42 are provided: a port A which communicates to the bore of the cylinder 32 above the piston 35; a port B which communicates from the passage $B^1$ to the lower end of the cylinder; a port C which is connected by means of the flexible pipe $C^1$ to the inner end of the cylinder 20; an exhaust port $E^1$, adjacent the port C; and an exhaust port $E^2$ which is located between the ports A and B. The valve disc 41 is provided with the lobes 46 and 47 for covering the ports C and the pair of ports A and B respectively. In the under surface of the lobes, suitable channel ports 48 and 49 are provided for connecting the supply ports to their respective exhaust ports.

In operating the machine, the valve is set in the position shown in Fig. 10. In this position, pressure is communicated through the port C into the cylinder 20 for pressing the piston 21 outwardly to hold the cutter away from the work, and the port A is connected by means of the channel 49 to the exhaust port $E^2$ so that pressure is released from the upper end of the piston 35. The handle 44 is next moved further to the right to the position shown in Fig. 11. In this position, the port $C^2$ is fully uncovered to the air pressure and the port B is also open to supply pressure to the under side of the piston 35 for raising the work clamp 38.

The work, such as a chair bottom or similar article, is placed on suitable guides 50, secured to the top of the table 4. Then the handle 44 is rotated to the left, as shown in Fig. 12, to uncover the port A and connect the port B to the exhaust port $E^2$. This exhausts the air below the piston 35 and supplies pressure to force the piston down to firmly clamp the work. To bring the cutter into contact with the work, the handle 44 is rotated further to the left as shown in Fig. 13. In this position, full pressure is communicated through the port A to the top of the cylinder 35, and the port C is connected to the exhaust port $E^1$, to exhaust the pressure from the cylinder 20 and allow the weight, which is connected to the cable 18, to draw the cutter 12 into contact with the work.

From this arrangement, it can be seen that an interlocking control is provided for the cutter and the work clamp. The cutter cannot be brought into engagement with the work until the clamp is down and the cutter is automatically moved away from the work before the clamp is raised. The machine can be operated very quickly with the single control, with no danger of accidents through improper manipulation on the part of the operator in attempting to gain speed.

While but one specific embodiment of this invention has been herein shown and described, it will be understood that details of the construction shown may be altered or omitted without departing from the spirit of this invention as defined by the following claims:

I claim:

1. In a woodworking machine having a rotary work support table and a revolving cutter mounted on a swinging arm which is constantly urged to move the cutter into contact with the work mounted on the table, clamping means for holding the work on the table, means for swinging the arm to move the cutter out of contact with the work, and a single control device for controlling both of said means.

2. In a woodworking machine having a rotary work support table and a revolving cutter mounted in a swinging arm which is weighted to urge the cutter toward work mounted on the support, pneumatic means for swinging the arm to move the cutter away from the work, pneumatic means for clamping the work to the support, and a valve for simultaneously controlling both of said means.

3. In a woodworking machine having a rotary work support table and a revolving cutter which is urged toward the work mounted on the cutter, a clamp for holding work on the table, means for moving the cutter away from the work, and a single lever for simultaneously controlling both the clamp and said means so that the cutter cannot be engaged with the work unless the clamp is holding the work.

4. In a woodworking machine having a rotary work support table and a revolving cutter mounted on a swinging arm which is constantly urged to move the cutter into contact with the work mounted on the table, clamping means for holding the work on the table, and means interlocked with said means for swinging the arm to move the cutter out of contact with the work.

5. In a wood shaper having a base, a work support table rotatably mounted on the base, and a revolving cutter mounted on an arm pivoted on the base and weighted to swing the cutter into contact with work mounted on the table; pneumatic means for clamping work to the table, pneumatic means mounted on the base for moving the arm to swing the cutter away from the work, and a single air valve for controlling both of said means.

Signed at Chicago this 19th day of January, 1928.

OSCAR ONSRUD.